United States Patent [19]

Nishida et al.

[11] Patent Number: 4,986,861

[45] Date of Patent: Jan. 22, 1991

[54] SEMICONDUCTOR PRESSURE SENSOR AND METHOD FOR BONDING SEMICONDUCTOR CHIP TO METAL DIAPHRAGM THEREOF

[75] Inventors: Minoru Nishida, Okazaki; Naohito Mizuno, Nishio; Tadashi Hattori, Okazaki; Seizi Huzino, Anjo; Yoshiyasu Ando, Nishio, all of Japan

[73] Assignee: Nippon Soken, Inc., Nishio, Japan

[21] Appl. No.: 322,561

[22] Filed: Mar. 13, 1989

Related U.S. Application Data

[62] Division of Ser. No. 50,031, May 15, 1987, Pat. No. 4,840,067.

[30] Foreign Application Priority Data

Jun. 13, 1986 [JP] Japan ................................ 61-138731

[51] Int. Cl.$^5$ ............................................. B32B 31/04
[52] U.S. Cl. .......................................... 156/89; 73/726; 357/80
[58] Field of Search ...................... 156/89; 29/569.1; 357/67, 80; 228/123, 179, 206, 211; 427/307, 327, 330; 73/726

[56] References Cited

U.S. PATENT DOCUMENTS

| | | | |
|---|---|---|---|
| 3,526,814 | 9/1970 | Piedra et al. | 357/80 |
| 4,437,228 | 3/1984 | Yamamoto et al. | 73/726 |
| 4,445,385 | 5/1984 | Endo | 73/726 |
| 4,592,794 | 6/1986 | Davis et al. | 156/89 |
| 4,820,659 | 4/1989 | Dholakia et al. | 357/80 |

Primary Examiner—Caleb Weston
Attorney, Agent, or Firm—Cushman, Darby & Cushman

[57] ABSTRACT

A semiconductor pressure sensor having a cylindrical housing with an opening formed at its tip end which is exposed to a pressure atmosphere and a metal diaphragm for receiving pressure, which is formed in a wall of the cylindrical housing defining the opening. A metal oxide layer is formed in a surface of the metal diaphragm by oxidizing the surface of the metal diaphragm, and a glass layer is formed on the metal oxide layer. A semiconductor chip, on which a strain gauge is formed, is firmly and surely bonded to the metal diaphragm through the glass layer by virtue of the metal oxide layer. This semiconductor pressure sensor can measure high pressure with sufficient sensitivity and high accuracy.

9 Claims, 3 Drawing Sheets

4,986,861

SEMICONDUCTOR PRESSURE SENSOR AND METHOD FOR BONDING SEMICONDUCTOR CHIP TO METAL DIAPHRAGM THEREOF

This is a division of application Ser. No. 07/050,031, filed May 15, 1987, now U.S. Pat. No. 4,840,067.

BACKGROUND OF THE INVENTION

1. Field of the Invention

The present invention relates to a semiconductor pressure sensor and a method for bonding a semiconductor chip to a metal diaphragm thereof, and more particulary to an accurate semiconductor pressure sensor suitable for the detection of high pressure and a bonding method therefor.

2. Description of the Prior Art

In many cases, there have been used pressure sensors, each being provided with such a pressure sensing diaphragm as to deform in response to the measured pressure. These pressure sensors sense the amount of deformation of the diaphragm by means of a strain gauge. In particular, for measuring high pressure, it is desired to use a metal diaphragm having pressure resistance. For example, Japanese examined patent publication No. Sho 58-5372 discloses a pressure sensor provided with a measuring portion composed of a metal diaphragm and a metal strain gauge bonded to the metal diaphragm. However, this metal strain gauge has a defect that the output sensitivity is low. This results in multistage amplification and noise removal being required, and accordingly the measuring circuit becomes complex.

Recently, pressure sensors, each being provided with a semiconductor strain gauge having a linear and high sensitive output have been noted. In each of these pressure detectors, a semiconductor chip itself composes a pressure receiving diaphragm (U.S. Pat. No. 3,858,150 for example). Therefore, these pressure sensors cannot be used for sensing high pressure.

For obtaining a pressure sensor durable against high pressure and having excellent output sensitivity, it has been thought of to combine the metal diaphragm with the semiconductor chip composing the semiconductor strain gauge. However, such a bonding structure to bond the semiconductor chip to the metal diaphragm with sufficient strenght has not been found as yet.

SUMMARY OF THE INVENTION

Accordingly, it is an object of the present invention to provide a semiconductor pressure sensor of good performance, wherein a strain gauge semiconductor chip may be firmly and surely bonded to a metal diaphragm.

The semiconductor pressure sensor according to the present invention has a metal diaphragm for receiving pressure, a metal oxide layer formed in a surface of the metal diaphragm by oxidizing the surface of the metal diaphragm, a glass layer formed on the metal oxide layer and a semiconductor chip on which a strain gauge is formed. The semiconductor chip is firmly bonded to the glass layer.

In the semiconductor pressure sensor having the above-described structure, the semiconductor chip is firmly and surely bonded to the metal diaphragm. And this semiconductor pressure sensor can measure high pressure with sufficient sensitivity and high accuracy.

DETAILED DESCRIPTION OF THE EMBODIMENTS

Figure 2:
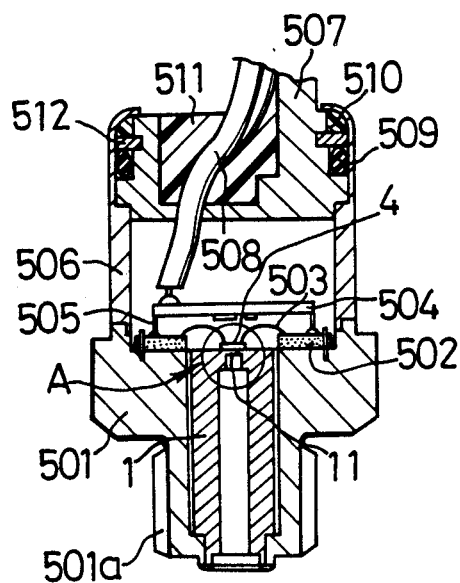
FIG. 2 is a sectional view of an overall semiconductor pressure detector.

In FIG. 2, a housing 501 is composed of a cylindrical metal body. The upper half portion of the housing 501 has a hexagonal section and the lower half portion thereof is provided with a screw portion 501a in its outer periphery.

A sensing body 1 is inserted into the housing 501. The sensing body 1 is composed of a cylindrical body having a closed upper end and an open lower end. The peripheral edge of the open lower end is welded to the inner edge of an opening of the housing 501. The sensing body 1 is made of Fe-Ni-Co alloy having a low coefficient of thermal expansion. The central portion of the closed upper end surface of the sensing body 1 is formed into a thin-walled diaphragm 11 for receiving pressure.

A semiconductor chip 4 is bonded to the upper surface of the diaphragm 11 by a bonding structure as described later. The semiconductor chip 4 is connected to electrodes formed on a ring-shaped ceramic substrate 502 provided on the upper surface of the housing 501 so as to surround the semiconductor chip 4, by way of lead wires 503.

A ceramic substrate 504 on which an IC circuit for processing signals is formed, is disposed above the semiconductor chip 4. The IC circuit is connected to the electrodes formed on the substrate 502 through pins 505 which support the substrate 504.

A cylindrical cover 506 is bonded to the outer peripheral edge of the upper surface of the housing 501, and a lead holder 507 is closely fit in an upper opening of the cover 506. A lead wire 508 extends from the substrate 504 to the outside of the sensor, penetrating the lead holder 507. In FIG. 2, reference numeral 509 denotes a seal ring, 510, 511 denote seal resins, and 512 denotes a push ring for the seal ring 509.

Figure 3:
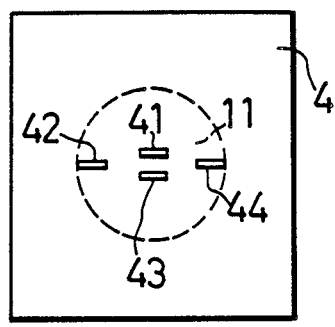
FIG. 3 is a plan view of a semiconductor chip.
Figure 4:
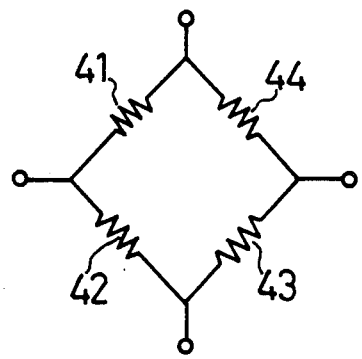
FIG. 4 is a wiring diagram of a strain gauge elements.

The semiconductor chip 4 is provided with P-type semiconductor strain gauge elements 41, 42, 43, and 44 which are formed at four points on a silicon (Si) substrate surface by doping boron (B) as shown in FIG. 3. The strain gauge elements 41 and 43 are positioned just above the center of the diaphragm 11 while strain gauge elements 42 and 44 are placed just above the peripheral portion of the diaphragm 11. These elements 41 to 44 are connected to each other through electrode leads (not shown) formed on the silicon substrate to form a full bridge as shown in FIG. 4.

Figure 1:
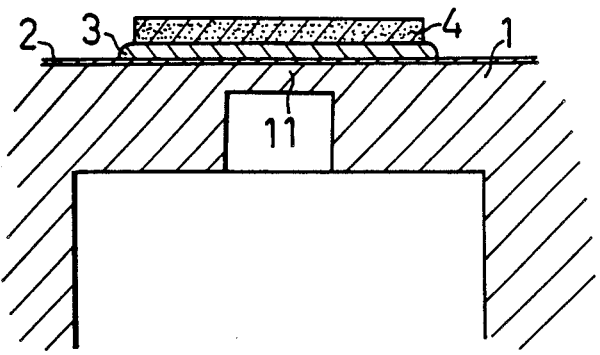
FIG. 1 is a sectional view of a main part of a semiconductor pressure sensor according to the present invention, which is an enlarged sectional view of the portion A of FIG. 2.

The bonding structure of the semiconductor chip 4 and the sensing body 1 is shown in FIG. 1. In FIG. 1, the portion encircled by a circle A shown in FIG. 2 is enlarged.

The whole upper surface of the sensing body 1 is oxidized to form an oxide layer 2. Then, the semiconductor chip 4 is bonded on the oxide layer 2 through a low melting point glass layer 3.

Figure 5:
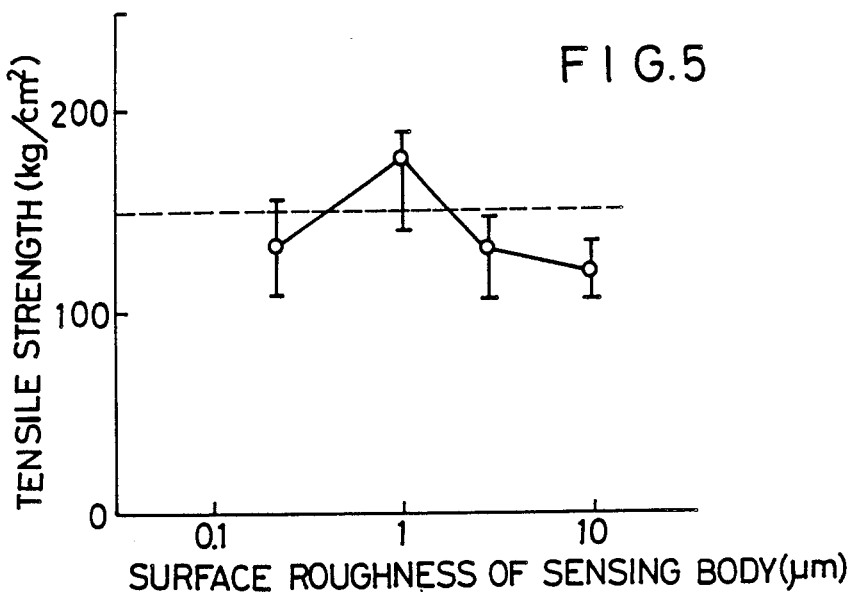
FIG. 5 is a graph showing the relation between the surface roughness of a sensing body and the tensile strength.
Figure 6:
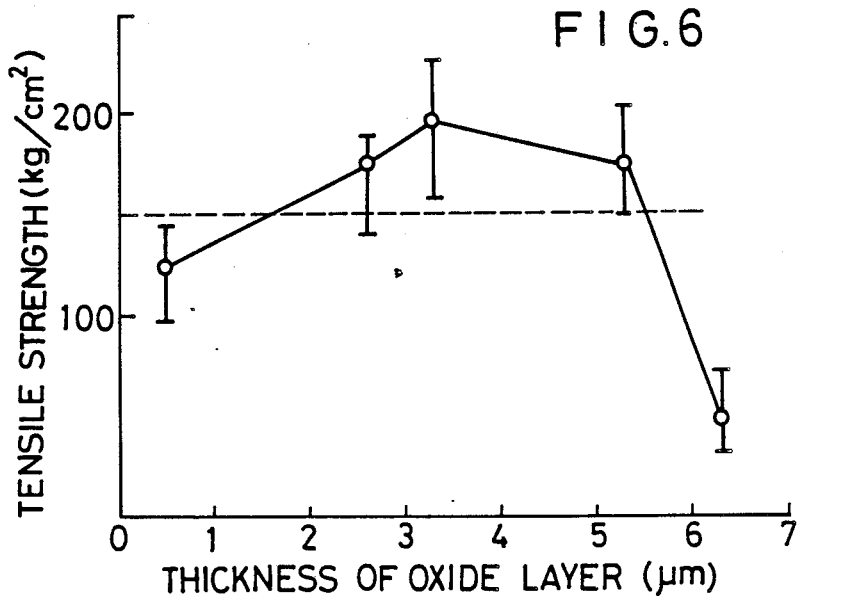
FIG. 6 is a graph showing the relation between the thickness of an oxide layer and the tensile strenght.

The bonding strength in bonding portions of the bonding structure shown in FIG. 1 is measured by a tensile test, the results being shown in FIGS. 5 and 6. As shown in FIG. 5, when the surface-roughness of the sensing body 1 is 0.5 μm to 3 μm, good tensile strength higher than 150 kg/cm² can be obtained. When the depth of the oxide layer 2 is about 1.5 μm to 5.5 μm, on the other hand, sufficient bonding strength higher than 150 kg/cm² can be obtained as shown in FIG. 6.

Non-crystal low melting point glass containing lead oxide as a main ingredient is used as the glass layer 3. It is preferable to form the thickness of the glass layer 3 to 40 to 60 μm (Table 1) and to form the particle diameter of a filler thereof to about 2.0 μm as an average value and about 20 μm as the maximum (Table 2). However, when the thickness of the glass layer 3 is larger than 60 μm, both the sensitivity and strength are drastically decreased.

A thermal shock test of cooling at −40° C. and heating at 120° C. shown in Tables 1 and 2 is repeated 200 times per hour and a high pressure operation test of applying a presssure load of 200 kg/cm² four times per minute is repeated one million times. In Tables 1 and 2, "O" denotes that no drift occurs in the output signals from the semiconductor chip after these tests while "X" denotes that some drift occurs in output signals from the semiconductor chip 4 after these tests.

Figure 7:
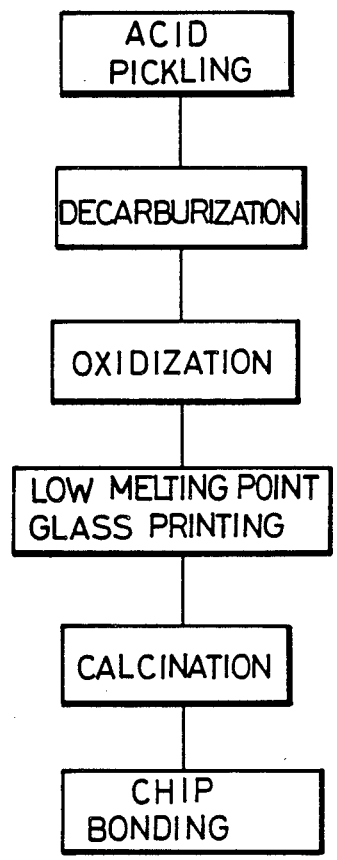
FIG. 7 is a schematic block diagram of the bonding process.

The method for forming the above-described bonding structure is roughly shown in FIG. 7.

At first, the surface of the sensing body 1 is subjected to the acid-pickling step and the decarburization step. The acid-pickling step is performed by removing oil components from the surface of the sensing body 1, using nitrohydrochloric acid. The decarburization step is performed by supplying steam in a deoxidizing and weak deoxidizing atmosphere containing H₂ and N₂ at 800° to 1100° C. for about 1 hour (Table 3, D, F, J, K, L).

Next, the surface of the sensing body 1 is subjected to oxidization process in an O₂(oxygen) atmosphere at 800° to 850° for 5 to 10 minutes (Table 3, D, F, J, K, L), whereby an oxide layer 2 of which the depth is 1.5 μm to 5.5 μm is formed.

The glass layer 3 is formed by printing a glass paste on the oxide layer 2 and calcining the printed glass paste at about 400° C. The thickness of the formed glass layer 3 is preferably 40 μm to 60 μm. The glass paste is obtained by mixing glass powder with an organic solvent.

The semiconductor chip 4 is placed on the calcined glass layer 3 and then is sintered at about 500° C., whereby the semiconductor chip 4 is firmly bonded to the sensing body 1.

In the semiconductor pressure sensor having the above-described structure, when the diaphragm 11 is deformed due to the introduced pressure, tensile stress is generated in the semiconductor chip 4 bonded to the diaphragm 11. This results in the resistance value of each of the strain gauge elements 41 and 43 on the chip 4 being drastically changed to obtain a linear output signal of high sensitivity, which corresponds to the measured pressure. Furthermore, when the inner peripheral surface of the sensing body 1 composing a pressure inlet port is subjected to the oxidization process, excellent corrosion resistance can be obtained.

As described above, according to the present invention, the diaphragm for directly receiving a high pressure is made of a metal of a high strength. Therefore, the diaphragm is durable against high pressure. Furthermore, the semiconductor chip provided with a semiconductor strain gauge is firmly bonded to the metallic diaphrgm through glass under most proper conditions. This results in the highly sensitive pressure sensor being obtained. According to the present invention, the semiconductor chip is previously formed and then jointed on the metal diaphragm. Therefore, mass-producible pressure sensors can be provided.

TABLE 1

| Glass No. | Thickness of Glass Layer | Thermal Shock Test | High Pressure Operation Test |
|---|---|---|---|
| C | 20 μm | X | X |
| C | 40 μm | O | O |
| C | 60 μm | O | O |

TABLE 2

| Glass No. | Particle Diameter of Filler Average | Particle Diameter of Filler Maximum | Thermal Shock Test | High Pressure Operation Test |
|---|---|---|---|---|
| A | 5.4 μm | 110 μm | X | X |
| B | 5.4 μm | 70 μm | X | X |
| C | 2.0 μm | 20 μm | O | O |

TABLE 3

| | Condition of Decarburization | Condition of Oxidization | Bonding State | |
|---|---|---|---|---|
| A | — | — | Insufficient Formation of Oxide Layer | X |
| B | — | 800° C. × 10 min | Generation of Bubbles in Glass Layer (Insufficient Bonding Strength) | X |
| C | 1000° C. × 1 hr | — | Insufficient Formation of Oxide Layer | X |
| D | 1000° C. × 1 hr | 800° C. × 10 min | Good Bonding | O |
| E | 1000° C. × 1 hr | 800° C. × 1 min | Insufficient Formation of Oxide Layer | X |
| F | 1000° C. × 1 hr | 800° C. × 5 min | Good Bonding | O |
| G | 1000° C. × 1 hr | 800° C. × 30 min | Too thick Oxide Layer (Insufficient Bonding Strength) | X |
| H | 1000° C. × 1 hr | 700° C. × 10 min | Insufficient Formation of Oxide Layer | X |
| I | 1000° C. × 1 hr | 900° C. × 10 min | Too thick Oxide Layer | X |
| J | 800° C. × 1 hr | 800° C. × 10 min | Good Bonding | O |
| K | 1100° C. × 1 hr | 800° C. × 10 min | Good Bonding | O |
| L | 1000° C. × 1 hr | 850° C. × 5 min | Good Bonding | O |

What is claimed is:

1. A method for bonding a semiconductor chip to a metal diaphragm, comprising the steps of:
   acid pickling a surface of said metal diaphragm to form a deoxidized surface;
   decarburizing said deoxidized surface;
   oxidizing said decarburized surface;
   placing a glass paste on said oxidized surface and calcining said glass paste to form a glass layer; and placing said semiconductor chip on said glass layer and sintering said semiconductor chip and said glass layer to bond said chip to said glass layer.

2. A method according to claim 1, wherein said decarburizing step is performed by supplying steam into a deoxidizing and weak deoxidizing atmosphere at 800° C. to 1100° C. for 1 hour.

3. A method according to claim 1, wherein said oxidizing step performed by exposing said decarburized surface of said metal diaphragm to an oxygen atmosphere at 800° to 850° C. for 5 to 10 minutes.

4. A method according to claim 1, wherein said calcining step is performed at about 400° C.

5. A method according to claim 1, wherein said sintering step is performed at about 500° C.

6. A method as in claim 1, wherein said metal diaphragm is formed of a Fe-Ni-Co alloy, and said semiconductor chip is made of a silicon substrate.

7. A method as in claim 1, wherein said oxidized surface, after said oxidizing step, has a thickness between 1.5 μm to 5.5 μm.

8. A method for bonding a semiconductor chip to a metal diaphragm to obtain a semiconductor pressure sensor comprising said metal diaphragm which deforms in proportion to a change in an applied pressure, an oxide layer formed in a surface of said metal diaphragm, a glass layer formed on said oxide layer, and said semiconductor chip having a strain gauge which produces output signals responsive to the deformation of said metal diaphragm, comprising the steps of:

providing said metal diaphragm having a surface roughness of 0.5 to 3 μm, this step comprising:

(a) acid pickling said surface of said metal diaphragm; and (b) decarburizing said acid pickled surface; oxidizing said decarburized surface to form said oxide layer;

forming said glass layer on said oxide layer by placing a glass paste on said oxide layer and calcining said glass paste; and placing said semiconductor chip on said glass layer and sintering said semiconductor chip and said glass layer.

9. A method for bonding a semiconductor chip to a metal diaphragm to obtain a semiconductor pressure sensor comprising said metal diaphragm which deforms in proportion to a change in an applied pressure, an oxide layer formed in a surface of said metal diaphragm, a glass layer formed on said oxide layer, and said semiconductor chip having a strain gauge which produces output signals responsive to the deformation of said metal diaphragm comprising the steps of:

acid pickling a surface of said metal diaphragm to form an acid pickled surface;

decarburizing said acid pickled surface;

oxidizing said decarburized surface to form said oxide layer;

forming said glass layer having a thickness in a range of substantially 40 μm to 60 μm, this step comprising:

(a) placing a glass paste on said oxide layer; and (b) calcining said glass paste; and placing said semiconductor chip on said glass layer and sintering said semiconductor chip and said glass layer.

* * * * *